G. G. & F. Crague,
Spinning Machine.
No. 77,173. Patented Apr. 28, 1868.
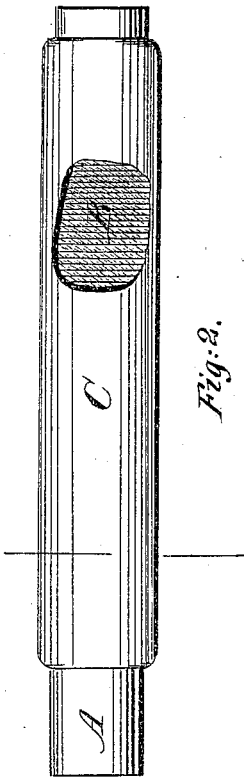
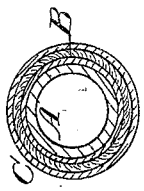
Fig. 1.
Fig. 2.
Witnesses
Theo. Tusche
Wm. Trewin
Inventor.
Francis Crague
Geo. G. Crague
Per Munn & Co.
Attorneys

United States Patent Office.

FRANCIS CRAGUE AND GEORGE G. CRAGUE, OF LEWISTON, MAINE, ASSIGNORS TO WILLIAM N. HIGGINS, AND SAID HIGGINS ASSIGNOR TO HIMSELF, F. O. SANDS, W. M. EMERSON, AND W. T. McNALLY.

Letters Patent No. 77,173, dated April 28, 1868.

IMPROVEMENT IN ROLLERS FOR DRAWING-MACHINES.

The Schedule referred to in these Letters Patent and making part of the same.

TO ALL WHOM IT MAY CONCERN:

Be it known that we, FRANCIS CRAGUE and GEORGE G. CRAGUE, of Lewiston, in the county of Androscoggin, and State of Maine, have invented a new and useful Improvement in Rolls for Cotton and Woollen-Machinery, and we do hereby declare that the following is a full, clear, and exact description thereof, which will enable those skilled in the art to make and use the same, reference being had to the accompanying drawings, forming part of this specification.

This invention relates to an improvement in machinery for the manufacture of cotton and woollen goods, whereby an important saving in the expense is secured; and the invention consists in covering the upper or top roller, in machines for treating cotton and wool, with new and at the same time cheaper and better material than has hitherto been employed for that purpose, as will be hereinafter more fully described. The drawing—

Figure 1, represents a longitudinal section of one of these rollers, with a portion of the outside coating broken away in order to show the inner covering.

Figure 2 is a cross-section of fig. 1 through the line $x \, x$.

Similar letters of reference indicate corresponding parts.

The method pursued heretofore in covering the "top rollers" of woollen and cotton-machinery, where there is a draught, has been to cover the core of the roll with thick woollen cloth, which cloth is glued on. Then this is covered with leather.

Now, in our method, we dispense with the leather, and cover the cloth with one or more layers of twine, of a size or fineness proportioned to the size of the roller.

The twine is wound on to the roller and saturated with varnish, and a surface is made of varnish of any suitable kind.

As seen in the drawing, the cord is concealed by the varnish, or by any other glutinous substance suitable for the purpose.

Ordinarily a roller covered in this manner will have a surface a little rough, which is not at all objectionable where the end or article to be operated upon is large.

In fact we think that in that case it is an improvement over the leather-covered roller, on account of its being a little rough on the surface, but as the end to be drawn passes through different machines, it becomes reduced in size, and requires smoother surfaces on the rollers.

This smooth surface for our rollers is readily produced by smoothing or polishing them in a lathe, by any suitable means, and adding more varnish, or other proper material, at the same time.

A represents the metallic roll, represented in the drawing in pale blue color. The layer of cloth is seen next to it under the twine.

B represents the twine, tightly wound around the roll thus covered with cloth.

C represents the surface, formed of varnish or other suitable substance.

Having thus described our invention, we claim as new, and desire to secure by Letters Patent—

The within-described roll for machines for treating cotton and wool, when constructed and operating as and for the purposes set forth.

FRANCIS CRAGUE,
GEORGE G. CRAGUE.

Witnesses:
D. T. WRIGHT,
N. C. CLARK.